United States Patent
McCarthy et al.

(10) Patent No.: US 9,843,832 B2
(45) Date of Patent: *Dec. 12, 2017

(54) STORING AND ACCESSING SEGMENTS OF RECORDED PROGRAMS

(71) Applicant: AT&T Intellectual Property I, L.P., Atlanta, GA (US)

(72) Inventors: Mary C. McCarthy, Frisco, TX (US); Elizabeth Lopez, Kyle, TX (US); Valerie H. Montalvo, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 79 days.

This patent is subject to a terminal disclaimer.

(21) Appl. No.: 14/673,576

(22) Filed: Mar. 30, 2015

(65) Prior Publication Data
US 2015/0208118 A1   Jul. 23, 2015

Related U.S. Application Data

(63) Continuation of application No. 12/014,024, filed on Jan. 14, 2008, now Pat. No. 8,995,824.

(51) Int. Cl.
*H04N 9/80* (2006.01)
*H04N 5/76* (2006.01)
(Continued)

(52) U.S. Cl.
CPC ....... *H04N 21/4334* (2013.01); *G11B 27/005* (2013.01); *G11B 27/034* (2013.01);
(Continued)

(58) Field of Classification Search
CPC .......... H04N 5/44543; H04N 5/44513; H04N 5/44582; H04N 5/44591; H04N 1/00413;
(Continued)

(56) References Cited

U.S. PATENT DOCUMENTS 5,832,171 A * 11/1998 Heist .................... H04N 9/8233
386/241
7,039,116 B1 * 5/2006 Zhang et al. ............ 375/240.26
(Continued)

OTHER PUBLICATIONS

International Search Report, International Patent Application No. PCT/US2009/030764, mailed Jul. 27, 2009, 4 pages.
(Continued)

*Primary Examiner* — Fatoumata Traore
*Assistant Examiner* — Trong Nguyen
(74) *Attorney, Agent, or Firm* — Jackson Walker L.L.P.

(57) ABSTRACT

An apparatus for recording multimedia content transmitted over a network including a reception interface for receiving the multimedia content from the network, a user input interface for receiving user inputs, and a storage resource including executable instructions including a recording module for recording the multimedia content in accordance with the user inputs. The user inputs also include a multimedia selection signal for indicating the multimedia content to be recorded, and a segmenting signal for indicating a size of at least one of a plurality of segments in which the multimedia content is recorded.

19 Claims, 15 Drawing Sheets

(51) Int. Cl.

| | |
|---|---|
| H04N 21/433 | (2011.01) |
| H04N 21/845 | (2011.01) |
| G11B 27/034 | (2006.01) |
| G11B 27/10 | (2006.01) |
| G11B 27/32 | (2006.01) |
| G11B 27/34 | (2006.01) |
| H04N 9/82 | (2006.01) |
| H04N 21/485 | (2011.01) |
| G11B 27/00 | (2006.01) |
| H04L 29/06 | (2006.01) |
| H04N 21/4147 | (2011.01) |
| H04N 21/61 | (2011.01) |
| H04N 5/765 | (2006.01) |
| H04N 5/775 | (2006.01) |
| H04N 5/781 | (2006.01) |
| H04N 5/85 | (2006.01) |
| H04N 5/907 | (2006.01) |
| H04N 21/472 | (2011.01) |

(52) U.S. Cl.
CPC ............ *G11B 27/10* (2013.01); *G11B 27/105* (2013.01); *G11B 27/329* (2013.01); *G11B 27/34* (2013.01); *H04L 65/608* (2013.01); *H04N 9/8205* (2013.01); *H04N 21/4147* (2013.01); *H04N 21/47217* (2013.01); *H04N 21/485* (2013.01); *H04N 21/6118* (2013.01); *H04N 21/6125* (2013.01); *H04N 21/845* (2013.01); *H04N 21/8456* (2013.01); *H04N 5/765* (2013.01); *H04N 5/775* (2013.01); *H04N 5/781* (2013.01); *H04N 5/85* (2013.01); *H04N 5/907* (2013.01); *H04N 21/47214* (2013.01)

(58) Field of Classification Search
CPC ............. H04N 21/482; H04N 21/4334; H04N 21/845; H04N 21/485; H04N 9/8205; H04N 21/4147; H04N 21/47217; H04N 21/6118; H04N 21/6125; G11B 27/005; G11B 27/034; G11B 27/10; G11B 27/105; G11B 27/329; G11B 27/34; H04L 65/608

See application file for complete search history.

(56) References Cited

U.S. PATENT DOCUMENTS

| | | | |
|---|---|---|---|
| 7,197,758 B1* | 3/2007 | Blackketter | G11B 27/105 348/E5.002 |
| 7,313,808 B1 | 12/2007 | Gupta | |
| 2004/0025180 A1* | 2/2004 | Begeja | G06F 17/30017 725/46 |
| 2004/0125124 A1 | 7/2004 | Kim et al. | |
| 2005/0166258 A1 | 7/2005 | Vasilevsky et al. | |
| 2006/0008242 A1* | 1/2006 | Dolph | 386/46 |
| 2006/0080716 A1 | 4/2006 | Nishikawa et al. | |
| 2006/0165375 A1 | 7/2006 | Choi et al. | |
| 2007/0098370 A1* | 5/2007 | Wells et al. | 386/112 |
| 2007/0154168 A1* | 7/2007 | Cordray et al. | 386/83 |
| 2007/0250874 A1 | 10/2007 | Howcroft | |

OTHER PUBLICATIONS

Written Opinion of the International Searching Authority, International Patent Application No. PCT/US2009/030764, mailed Jul. 27, 2009, 7 pages.

* cited by examiner

STORING AND ACCESSING SEGMENTS OF RECORDED PROGRAMS

This application is a continuation of U.S. patent application Ser. No. 12/014,024, filed Jan. 14, 2008, issuing as U.S. Pat. No. 8,995,824 on Mar. 31, 2015, the entirety of which is incorporated by reference herein.

BACKGROUND

Field of the Disclosure

The present disclosure relates to multimedia services and more particularly to recording multimedia content provided over a network.

Description of the Related Art

Service providers may provide their subscribers with various services including multimedia services by which viewers obtain television and other multimedia content, data services such as Internet access, and telephony services including local and/or long distance telephone and/or video phone services. Multimedia services sometimes include a feature enabling subscribers to record a program and play back the recorded program when desired.

DESCRIPTION OF THE EMBODIMENT(S)

Figure 1:
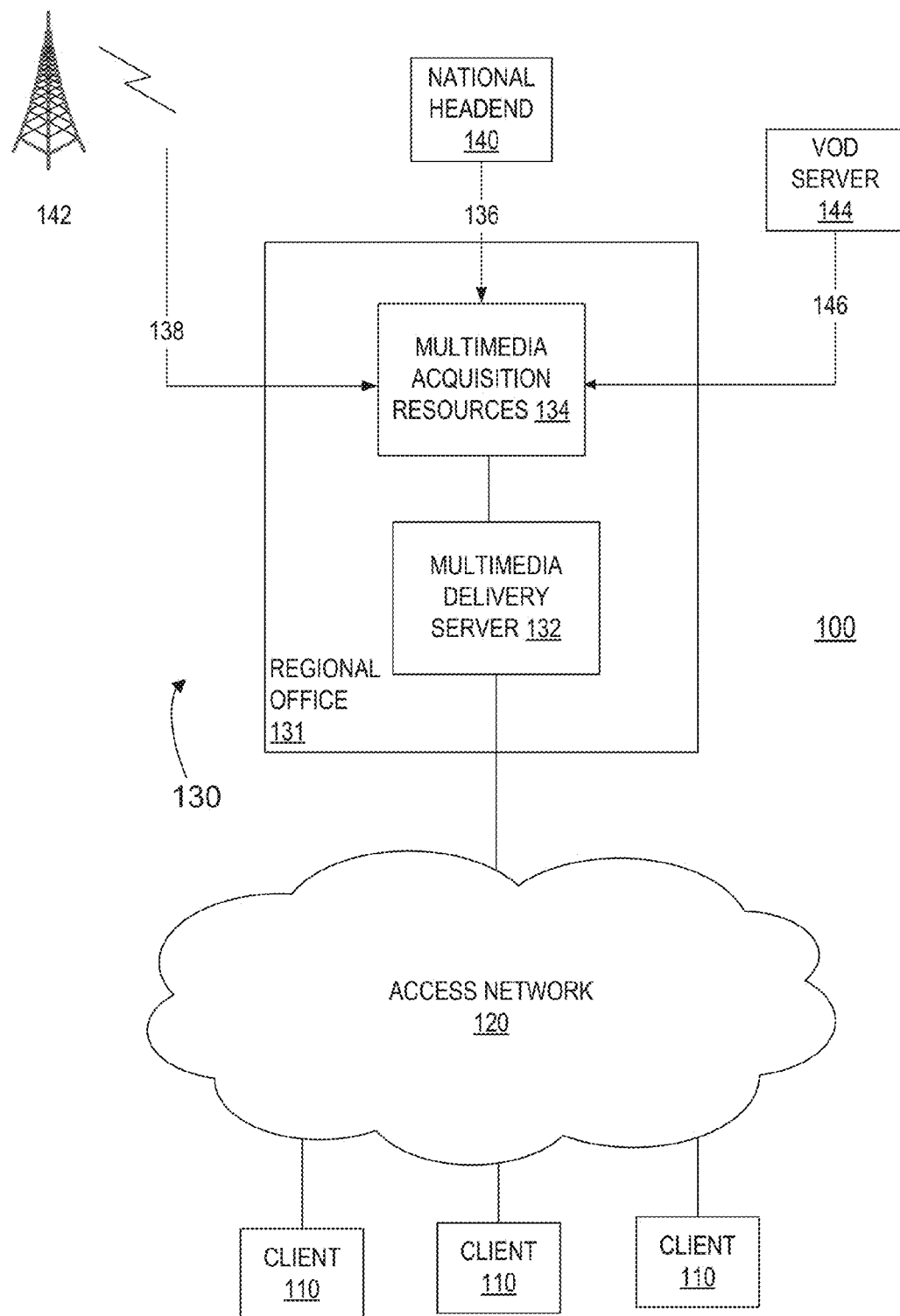
FIG. 1 is a block diagram of selected elements of an embodiment of a networked system for providing viewer services.

In one aspect, a disclosed apparatus for recording multimedia content includes a reception interface for receiving multimedia content from a network, a user input interface for receiving user inputs, and a computer readable storage resource embedded with computer executable instructions. The instructions include a recording module for recording the multimedia content in accordance with the user inputs. The user inputs supported by the recording module may include a multimedia selection input for indicating the multimedia content, also referred to herein as a program, to be recorded and a segmenting input for indicating a size of at least one of a plurality of content segments, also referred to herein as program segments, in which the multimedia content is recorded.

In some embodiments of the apparatus for recording a multimedia content, each of the plurality of content segments records a successive transmission segment of the multimedia content. The network may include an internet protocol television network or a coaxial cable-based network.

In some embodiments, the recording module enables a user to interact with a user display to list the recorded programs in a catalogue by program title and present the catalogue to the user. The recording module may also enable the user to select a program from the catalogue for viewing, determine whether the program includes or is otherwise associated with program segments, and display the program segments to a user in a separate menu.

In some embodiments, the recording module includes instructions to determine whether a recorded program has or is otherwise associated with content segments, and, if so, instructions for displaying the content segments in the catalogue to a user. In some embodiments, selecting one content segment causes playback of the selected content segment and each successive content segment. In addition, the user can select any ordered subset of the content segments to view and the selected content segments are then played back in the indicated ordered, skipping over any unselected content segments, altering the chronological order of program segments, or both.

In another aspect, a disclosed digital video recorder (DVR) is operable to enable a user to select multimedia content for recording, record the multimedia content in content segments, save the content segments in storage, and select a particular content segment or an ordered list of selected content segments for viewing. In some embodiments, the content segments correspond to successive transmission segments of the multimedia content. In some embodiments, a user is enabled to select a size of the particular content segment, to select multiple multimedia content to record, to select the size of content segments applicable to at least some of the multiple multimedia transmissions, to select a content segment from the catalogue, or to erase specific content segments from storage. Each content segment may be listed in a catalogue that is saved in storage.

In another aspect, a disclosed computer program product including computer executable instructions, stored on a tangible computer readable medium, for recording multimedia content transmitted over a network, provides instructions to transmit a multimedia content selection menu to a user to enable a user to select the multimedia content to record, transmit a content segment selection menu to the user to allow the user to select a content segment size, receive a multimedia content selection signal and the size from the user, record the selected multimedia content in content segments of the size selected by the user, and store the content segments in storage. The computer program product may further include instructions to display content segments to the user, respond to receiving a content selection signal corresponding to a specific content segment from the user by displaying the specific content segment, list content segments corresponding to a multimedia content in a catalogue by the multimedia content, respond to the user selecting the multimedia content from the catalogue by displaying the content segments to the user, display the catalogue to the user, and/or enable the user to select the multimedia content.

In another aspect, another disclosed computer program product includes instructions to include a content segmenting option in at least one interface for selecting multimedia content for recording and to respond to detecting a user selection of the content segmenting option by automatically inserting a plurality of bookmarks at user selectable locations within the recorded content when the content is recorded to demarcate user-defined chapters. The computer program product may include instructions to respond to detecting a request to list recorded content by displaying a listing of recorded content including displaying the recorded content with the chapters displayed hierarchically under the listing the selected content.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram of selected elements of a multimedia content distribution network 100, sometimes referred to herein simply as multimedia network 100. In the depicted embodiment, multimedia network 100 includes a plurality of clients 110 connected to a multimedia service provider 130 by an intervening access network 120.

In the embodiment depicted in FIG. 1, multimedia service provider 130 may encompass equipment and/or services operable to provide multimedia content to one or more subscribers. As used in this disclosure, the terms "multimedia" and "multimedia content" encompass motion video content, whether live or pre-recorded, including conventional television programming content, video-on-demand (VOD) content, pay-per-view (PPV) content, and so forth. The depicted embodiment of multimedia service provider 130 employs a hierarchical structure in which a regional office 131 receives national feed multimedia content 136 from a national headend 140 and supplements the nationally provided content with regional content 138. The regional offices 131, in turn, distribute content to clients 110 over access network 120. Clients 110 represent subscribers to services provided by multimedia service provider 130.

As depicted in FIG. 1, the depicted embodiment of regional office 131 includes multimedia acquisition resources 134 and a multimedia delivery server 132. Multimedia acquisition resources 134 encompass receivers, signal processors, and servers operable to receive multimedia content from one or more providers. As depicted in FIG. 1, for example, multimedia acquisition resources 134 receive national feed multimedia content 136 from national headend 140 via a fiber optic or other type of high bandwidth backbone. National feed multimedia content 136 may include nationally distributed programming such as CNN, TNT, ESPN, and the like. Multimedia acquisition resources 134 as shown also receive regional content 138 from one or more regional broadcasters 142, one of which is represented by the depicted broadcast transmission tower. Regional content 138 may include over-the-air broadcast content from legacy broadcasters including NBC, ABC, CBS, FOX, and PBS. Multimedia acquisition resources 134 may further receive VOD content 146 from a locally located or remotely located VOD server 144. In addition to the content received from each of these sources, regional office 131 may inject local advertising, public service announcements, and other additional content into multimedia delivery server 132.

Multimedia delivery server 132 encompasses resources that process content requests from clients 110 to provide and route requested content to the requesting client(s). In Internet protocol (IP) based implementations of access network 120, multimedia delivery server 132 may employ multicasting to deliver "live" content to multiple subscribers. Multicasting conserves bandwidth by transmitting just a single layer to multiple subscribers who have requested the same program. The multimedia delivery server 132 may also employ unicasting to deliver VOD and other "time shifted" content, PPV content, or other content that requires special payment provisions. Multimedia delivery server 132 may also encompass resources to authenticate requests to ensure that content is provided only to authorized subscribers according to any applicable terms of service.

Multimedia delivery server 132 may include resources to encode and/or format multimedia content so that the resulting content is suitable for transmission over access network 120. For example, multimedia delivery server 132 may employ a pervasive or proprietary coder/decoder (codec) to compress and/or encrypt content prior to transmission. Compression is widely used for multimedia content transmission and storage to reduce the amount of data that is transmitted over the network or stored in memory, disk, or another storage resource.

Figure 2:
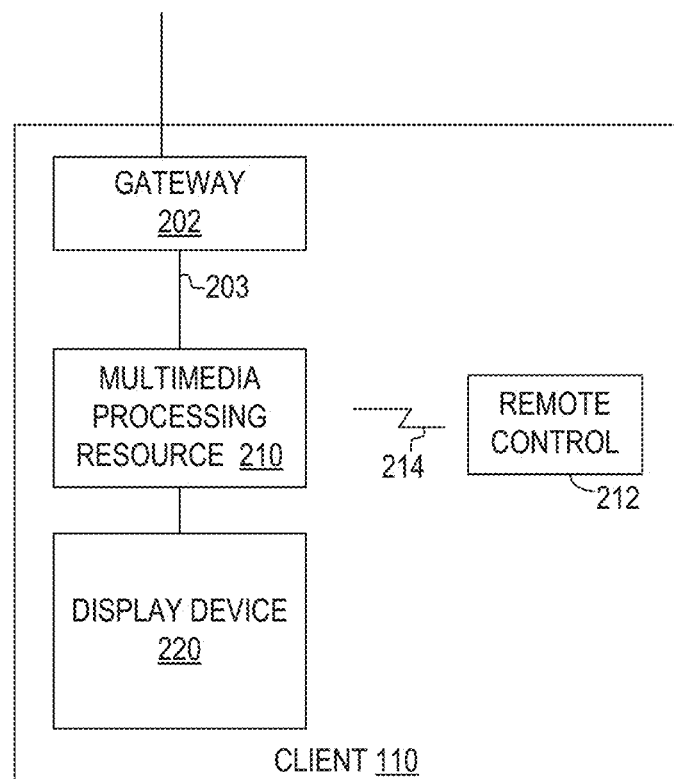
FIG. 2 is a block diagram of selected elements of an embodiment of a client suitable for use in the networked system of FIG. 1.

Referring to FIG. 2, a block diagram illustrates selected elements of an embodiment of client 110. In some embodiments, client 110 represents devices and/or applications used by a subscriber to multimedia services and/or a user or viewer of multimedia content. In the depicted embodiment, client 110 includes a residential gateway 202, a multimedia processing resource (MPR) 210, and a display device 220. Residential gateway 202 may provide a firewall and/or routing functionality between a local area network (LAN) 203 to which MPR 210 is connected and the access network 120. One skilled in the art will appreciate that, in other embodiments, including embodiments based on a coaxial access network, gateway 202 may be omitted. In embodiments of client 110 that employ an IP-based access network, gateway 202 receives multimedia content as a series of datagrams or packets. MPR 210 may assemble, decode, and otherwise digitally process multimedia content and convert the multimedia content to analog signals suitable for presentation to display device 220.

In some embodiments, MPR 210 is a special purpose data processing unit that includes, in addition to an embedded or general purpose microprocessor and storage, video processing elements including an audio/visual decoder, and an interface for receiving user input 214 from a remote control 212. Remote control 212 may employ infrared (IR) or radio frequency (RF) signals to convey user input 214. Although not shown explicitly, user input 214 may also included signals provided via panel buttons on a chassis of MPR 210. Display device 220 encompasses any monitor suitable for receiving audio/video content from MPR 210.

Figure 3:
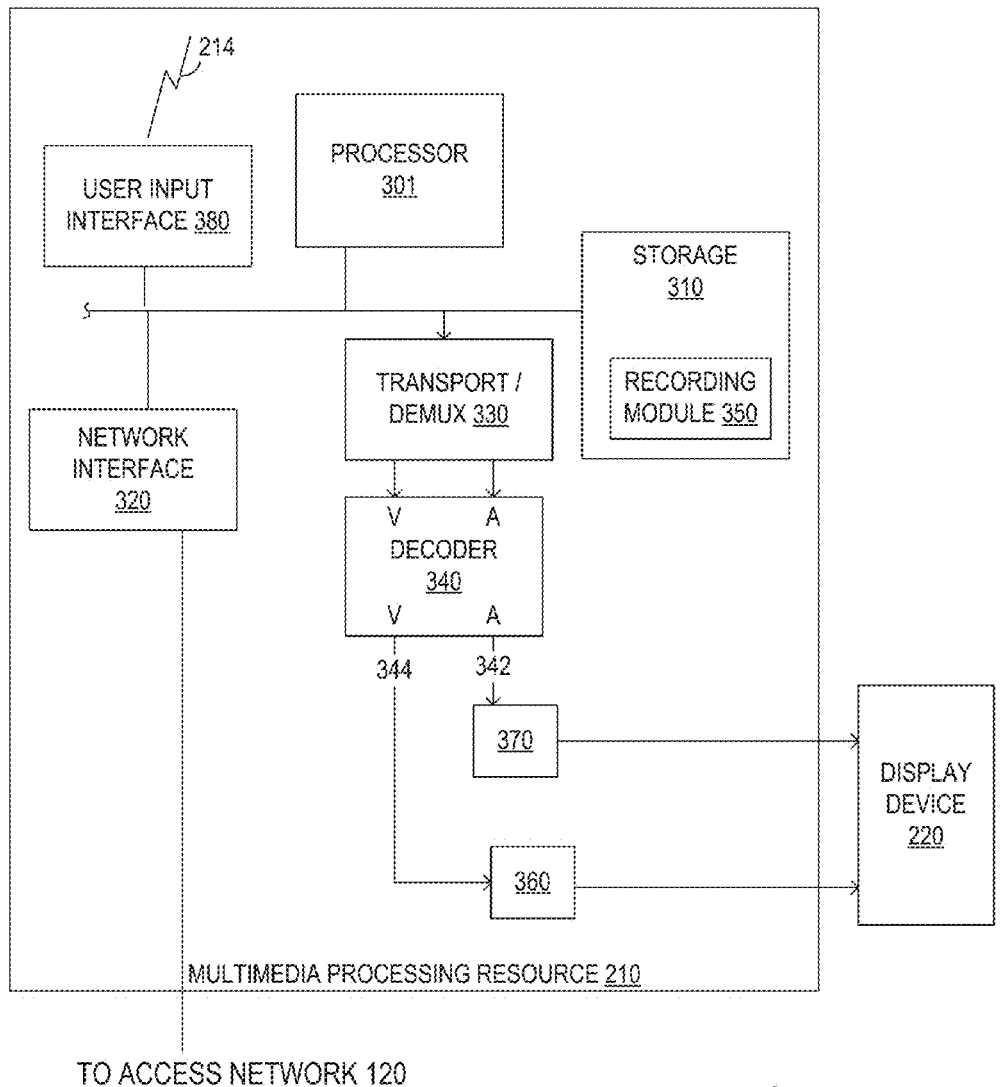
FIG. 3 is a block diagram of selected elements of an embodiment of a multimedia processing resource including a digital video recorder suitable for use in the client of FIG. 2.

Selected elements of an embodiment of MPR 210 are illustrated in the block diagram of FIG. 3. In some embodiments, MPR 210 may be implemented as a stand alone unit such as a set top box. In other embodiments, all or portions of MPR 210 may be integrated into the display device 220, gateway 202, or another component. In the depicted embodiment, MPR 210 includes a processor 301, a user input interface 380, a network interface 320, a transport/demux resource 330, a decoder 340, and a storage resource 310 accessible to processor 301. Storage resource 310 represents a computer readable storage medium suitable for storing data and executable instructions. Storage resource 310 may include persistent storage resources including, as examples, magnetic disk storage, flash memory storage, and optical storage such as compact disks (CDs) and digital versatile disks (DVDs). Storage resource 310 may also encompass volatile storage elements such as a dynamic or static random access memory (DRAM or SRAM). In the depicted embodiment storage resource 310 includes a program identified as recording module 350 for storage and playback of multimedia content that supports automated segmenting or chaptering as described below.

The user input interface 380 of MPR 210 is operable to receive user input 214 from remote control 212 or panel buttons on a chassis of MPR 210 and process received input into digital information that may be interpreted by processor 301. The network interface 320 enables MPR 210 to communicate via access network 120 either directly or through an intervening gateway such as gateway 202 (FIG. 2). Transport/demux resource 330 is employed with packet-based embodiments of access network 120 to process received packets into a stream and segregate audio and video information into separate streams. An audio/video decoder 340 processes the audio and video streams into "native format" video signal 344 and audio signal 342 using any of various decoders including, as examples, a Motion Pictures Expert Group 2 (MPEG-2) decoder, a VC-1 decoder, or an H.264 decoder. Signals 342 and 344 are encoded and/or converted to analog signals by DAC/encoders 360 and 370. The output of DAC/encoders 360 and 370 is suitable for delivering to a display device 220 that is compliant with a display device standard such as National Television System Committee (NTSC), Phase Alternating Line (PAL), or another suitable standard.

The depicted embodiment of MPR 210 is suitable for use in packet-based embodiments of access network 120. In cable-based access network embodiments, transport/demux resource 330 may not need to process packets into a stream. In addition, an MPR 210 suitable for use in cable-based systems may include one or more tuners to filter selected content from other content.

Figure 4A:
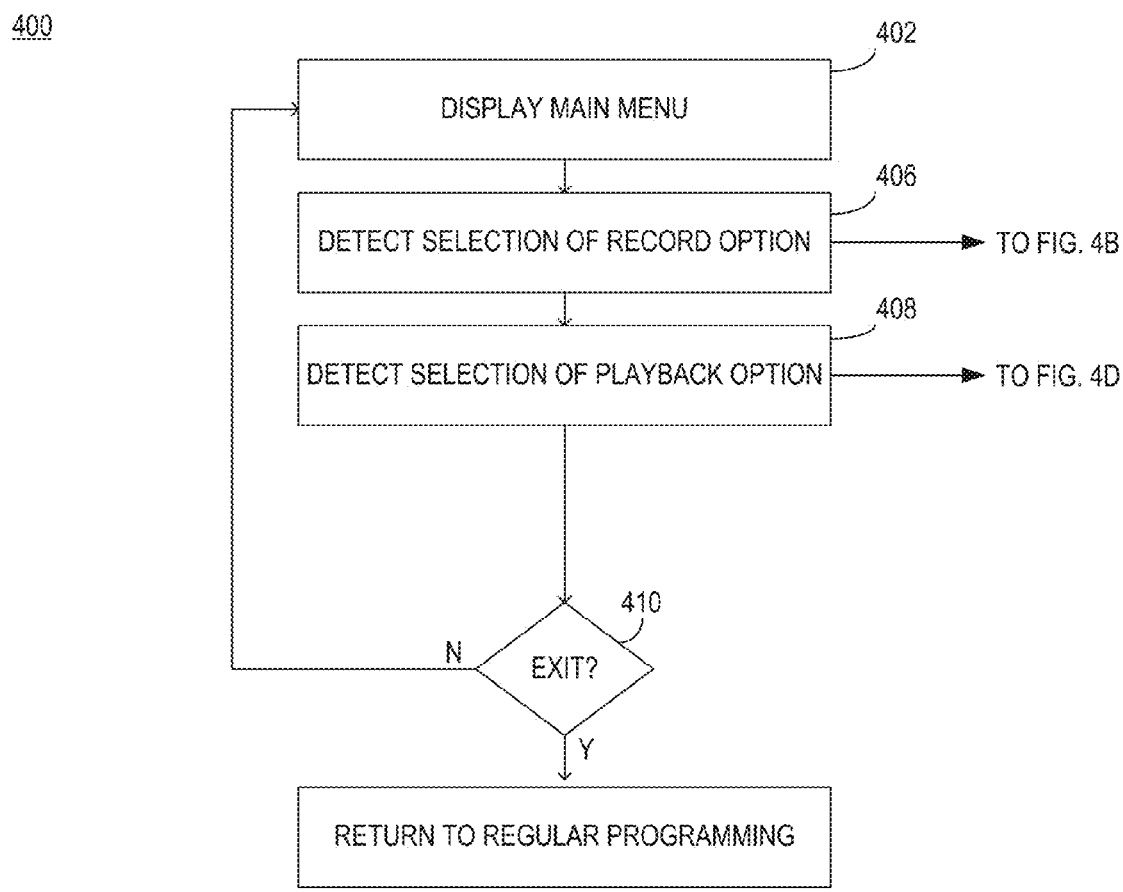
FIGS. 4A, 4B, 4C and 4D are flow diagrams of selected elements of an embodiment of a method and program for recording multimedia content using the digital video recorder.
Figure 5A:
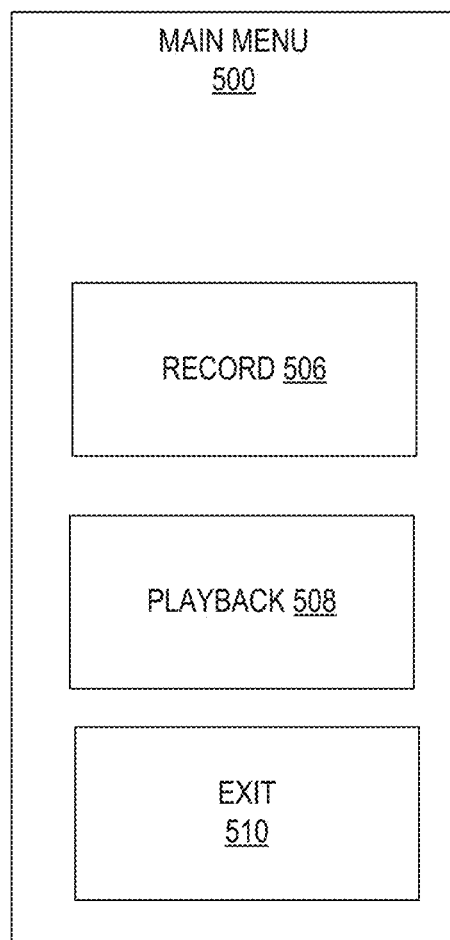
FIGS. 5A, 5B, and 5C are illustrations of exemplary embodiments of user displays suitable for use with the method and program of FIGS. 4A, 4B, 4C, and 4D.

Referring now to FIG. 4A and FIG. 5A, a flow diagram and screen depiction illustrate selected elements of an embodiment of a method 400 for recording and playing back multimedia content. Method 400 represents functionality supported by recording module 350 depicted in FIG. 3. The depicted embodiment of method 400 includes displaying (block 402) a main menu 500. The main menu 500 may be displayed, for example, on display device 220 in response to a particular user input 214. In the depicted implementation, main menu 500 offers the user three main options, a record option 506 corresponding to block 406, a playback option 508 corresponding to block 408, and an exit option 510 corresponding to block 410. If, in determination block 410, the method determines that the user of client 110 elects to exit the main menu 500, method 400 exits or otherwise closes the main menu and returns to regular programming.

Figure 4B:
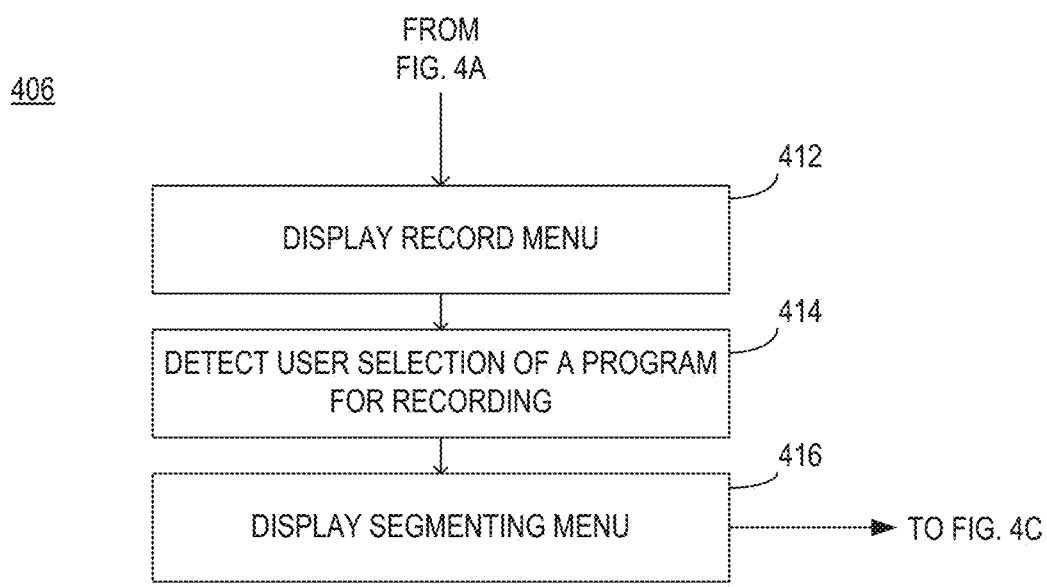
Figure 5B:
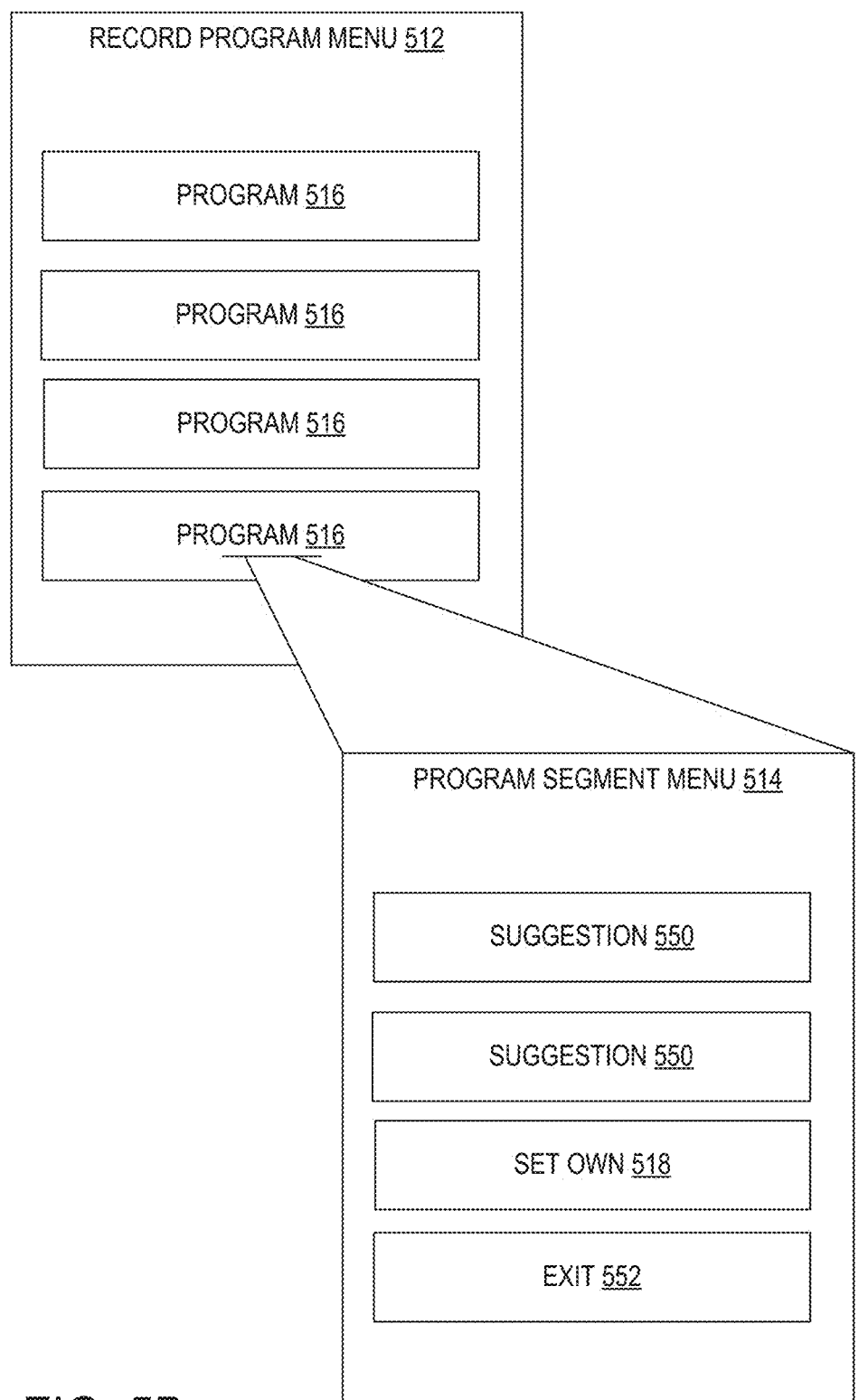

Referring now to FIG. 4B and FIG. 5B, a flow diagram and screen depiction illustrate selected elements of an embodiment of a method 406 for recording multimedia content. The depicted embodiment of method 406 includes displaying (block 412) a record program menu 512. In the depicted implementation, the record menu 512 presents the user with multimedia content items or programs 516 that a user may select (block 414) for recording. When a use selects a program for recording, a segments menu 514 is displayed (block 416), and a segmenting method 404 is initiated.

Figure 4C:
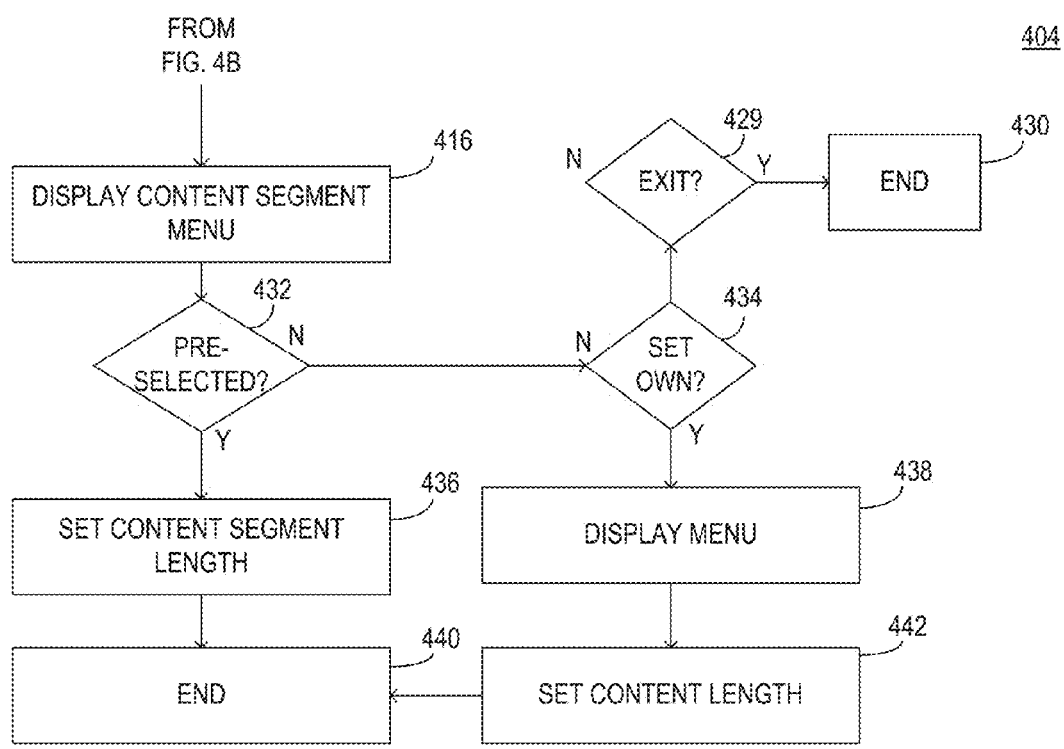

Referring now to FIG. 4C and FIG. 5B, a flow diagram and screen depiction illustrate selected elements of an embodiment of a segmenting method 404. The depicted embodiment of method 404 includes displaying (block 416) a program segment menu 514. In some embodiments, program segment menu 514 displays when the user selects a program to record. The depicted embodiment of program segment menu 514 presents the user with the option to select (determination block 432) segment size suggestions 550 generated from metadata known about the program content, i.e., program length, etc., the option to select (determination block 434) the user's own segment size 518, and the option 552 to select (determination block 429) to exit (block 430) the segments menu 514. If the user selects the content size suggestions 550, the segment length is set (block 436) and stored in, for example, storage 310 and method 404 returns (block 440) to the main menu 500. If the user selects to choose their own segment size 518, a menu is displayed (block 438) that allows the user to set the segment size in, e.g., minutes. Once a segment size is entered, the content length is set and stored (block 442) in, for example, storage 310 and method 404 returns (block 440) to the main menu 500. If the user selects option 552 to exit the segments menu, method 404 returns (block 440) to the main menu 500.

Figure 4D:
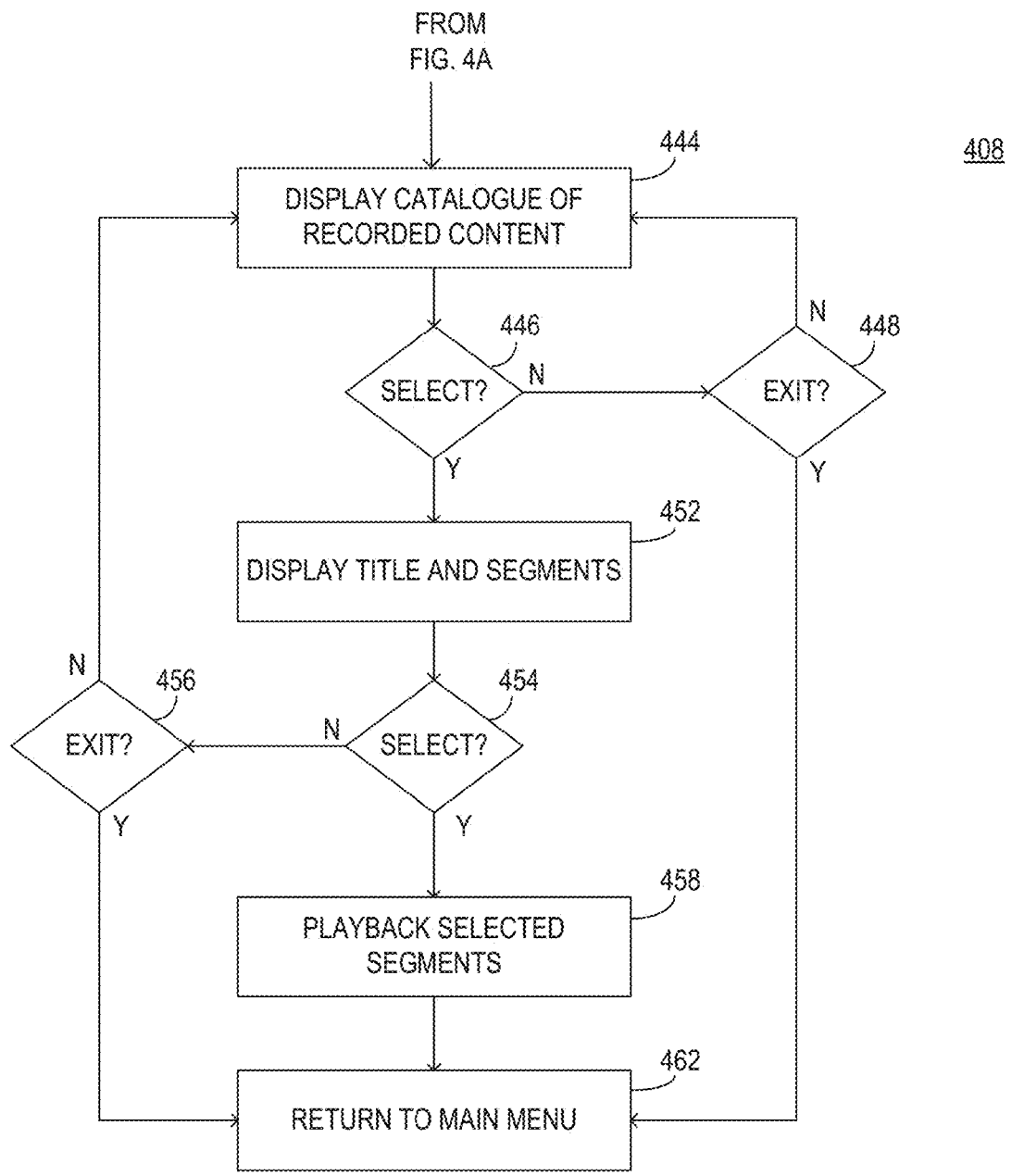
Figure 5C:
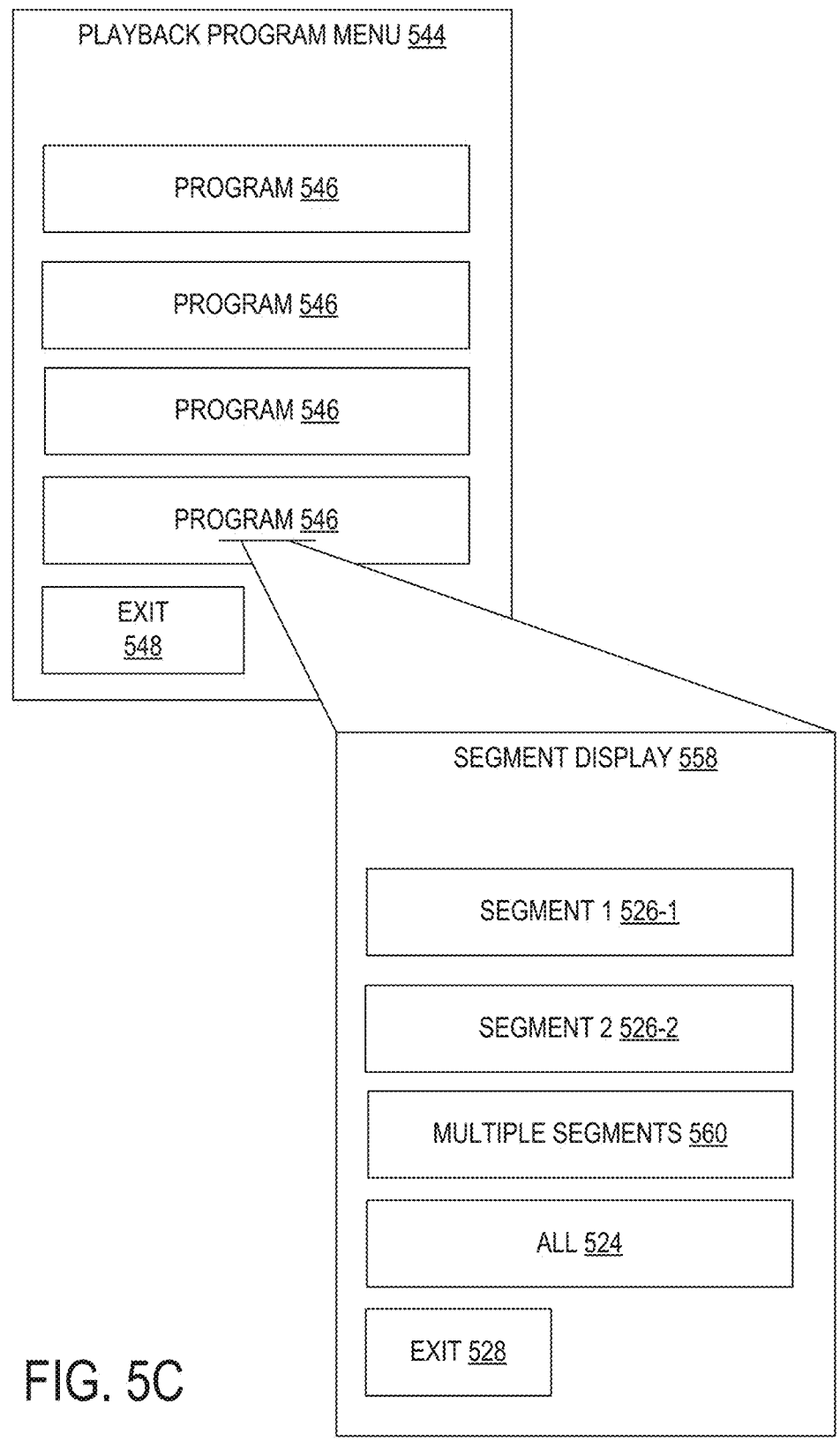

Referring now to FIG. 4D and FIG. 5C, a flow diagram and screen depiction illustrate selected elements of an embodiment of a method 408 for selecting recorded programs or other recorded multimedia content for viewing or play back. The depicted embodiment of method 408 includes displaying (block 444) a playback menu 544 as a catalogue of recorded programs. In the depicted implementation, play back menu 544 presents the user with the option to select (determination block 446) a program 546 for viewing, or the option to exit (block 448) the menu 544 and return to the main menu 500. When a program is selected, a segment display menu 558 is displayed (block 452), and the user is given the option to select a single segment 526, an ordered list of multiple segments 560, or all segments 524 corresponding to determination block 454, and the option 528 to exit the menu and return to the play back menu 544 corresponding to determination block 456. If the user selects the exit option 528, method 408 returns (block 462) to the main menu 500. If the user selects a single segment 526, the selected segment 526 is played back (block 458) to the user, and method 404 returns (block 462) to the main menu 500. If the user selects to view multiple segments 560 or all segment 524, the selected segments are played back (block 458) to the user, and method 408 returns (block 462) to the main menu 500. This description of the playback method and program are illustrative only, and one skilled in the art will appreciate that there are multiple options for playing back programs that are recorded and segmented, e.g., playing a segment and all successive segments, playing segments starting at one segment and ending at another, playing segments according to an ordered list of some or all of the segments, etc.

Figure 6A:
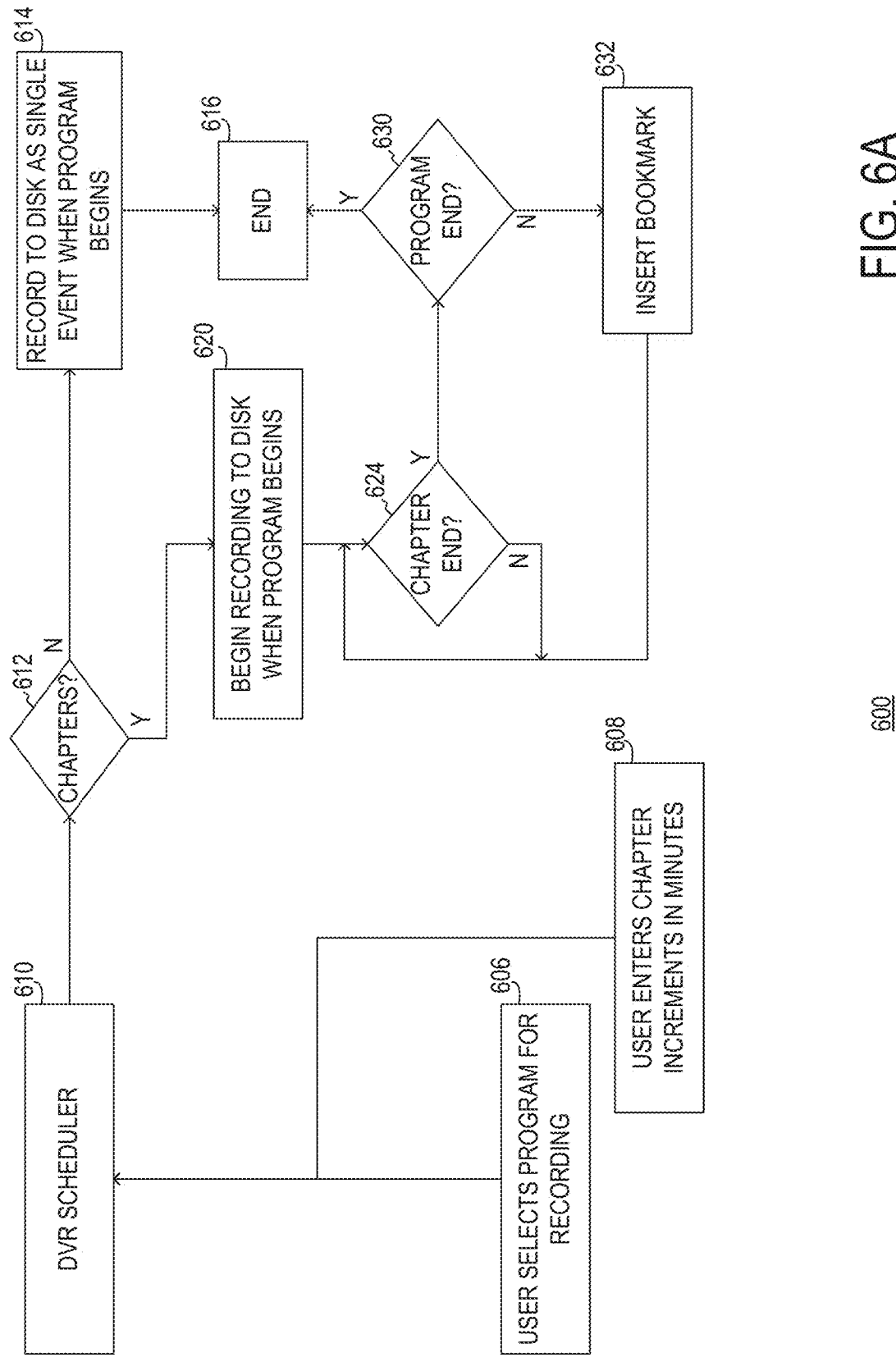
FIGS. 6A and 6B are flow diagrams of selected elements of an embodiment of a method for recording and playing back multimedia content using the multimedia processing resource of FIG. 3.

Referring now to FIG. 6A, a flow diagram illustrates an embodiment of an operating method 600 for the MPR 210 of FIG. 3. In the depicted embodiment, a user provides user input 214 to select (block 606) a program for recording and selects (block 608) an increment size, e.g., in minutes, for segments, also referred to herein as chapters. The selected program and content size are provided to a DVR scheduler 610 that may be part of recording module 350. When the program begins, the processor 301 determines (determination block 612) whether segmenting or chaptering was requested for the selected program, and if not, executes (block 614) instructions to record the program to a disk or other form of storage resource 310 (FIG. 3) as a single event. If chaptering is requested by the user, method 600 begins recording (block 620) the program, and periodically determines (determination block 624) whether a chaptering period has elapsed. If the chaptering period has elapsed, and the program has not ended, as determined in block 630, a bookmark is inserted (block 632) into the recorded copy of the program. If the multimedia content transmission has ended, method 600 stops recording multimedia content and ends (block 616). If no milestones are met, method 600 continues recording the program until a chapter end is reached. Thus, in this embodiment, method 600 enables automated chaptering of recorded programs by automatically inserting bookmarks into the recorded content.

Figure 6B:
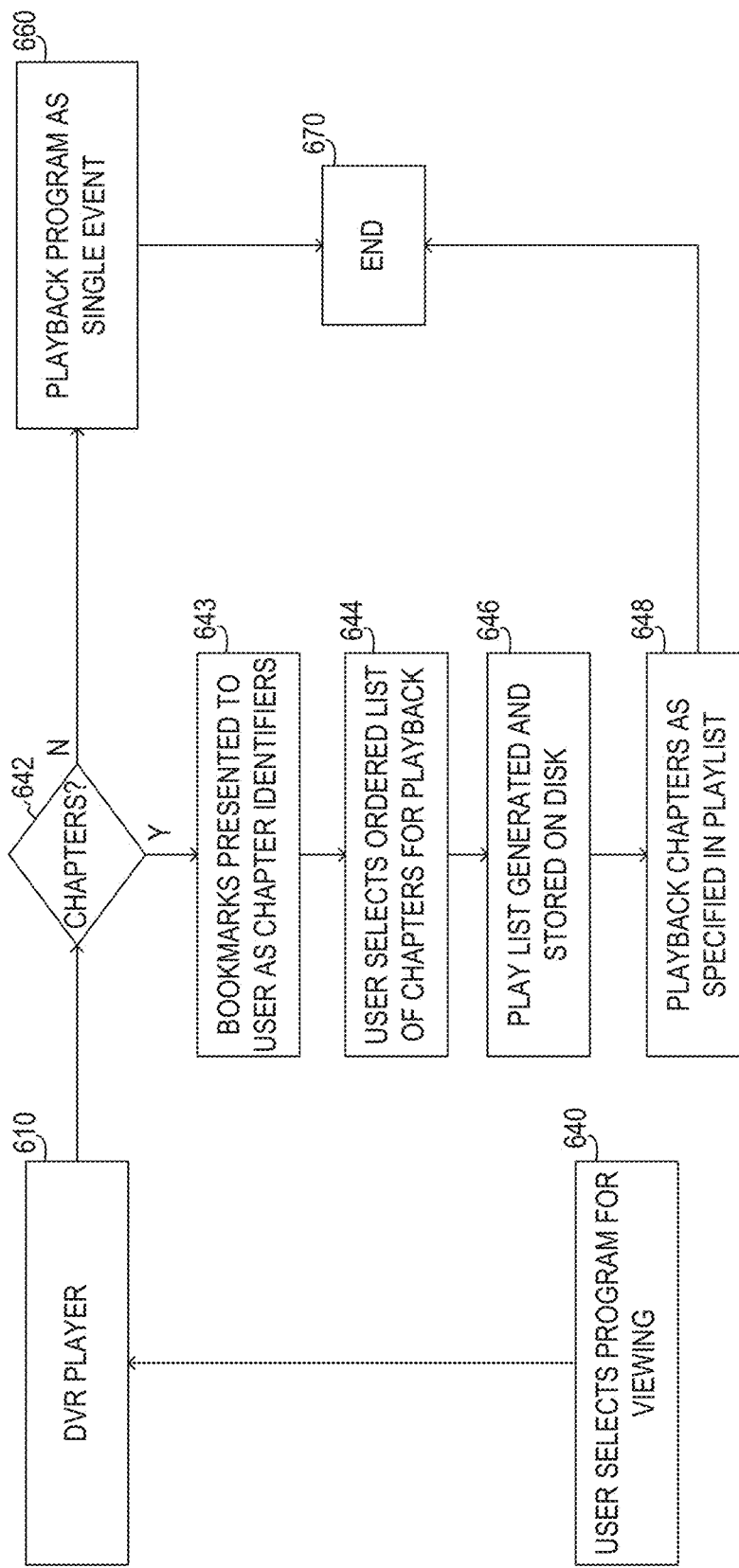

An embodiment of a method 680 illustrating playback operation of MPR 210 is illustrated in the flow diagram of FIG. 6B. In the depicted embodiment, a user provides user input 214 to a digital video recorder (DVR) player 610 to select (block 640) a program for viewing. Method 680 determines (block 642) whether the selected program has segments or chapters and, if not, retrieves and plays back (block 660) the program as a single event. If the program has chapters or segments, method 680 presents (block 643) bookmarks to the user as a means for identifying the chapters. The user selects (block 644) an ordered list of chapters for play back. Method 600 as shown includes generating (block 646) a playlist that may be stored to disk or another form of storage. The segments in the playlist are then played back (block 648), for example, to the user display 220 before method 680 returns (block 670) to the main menu.

Figure 7:
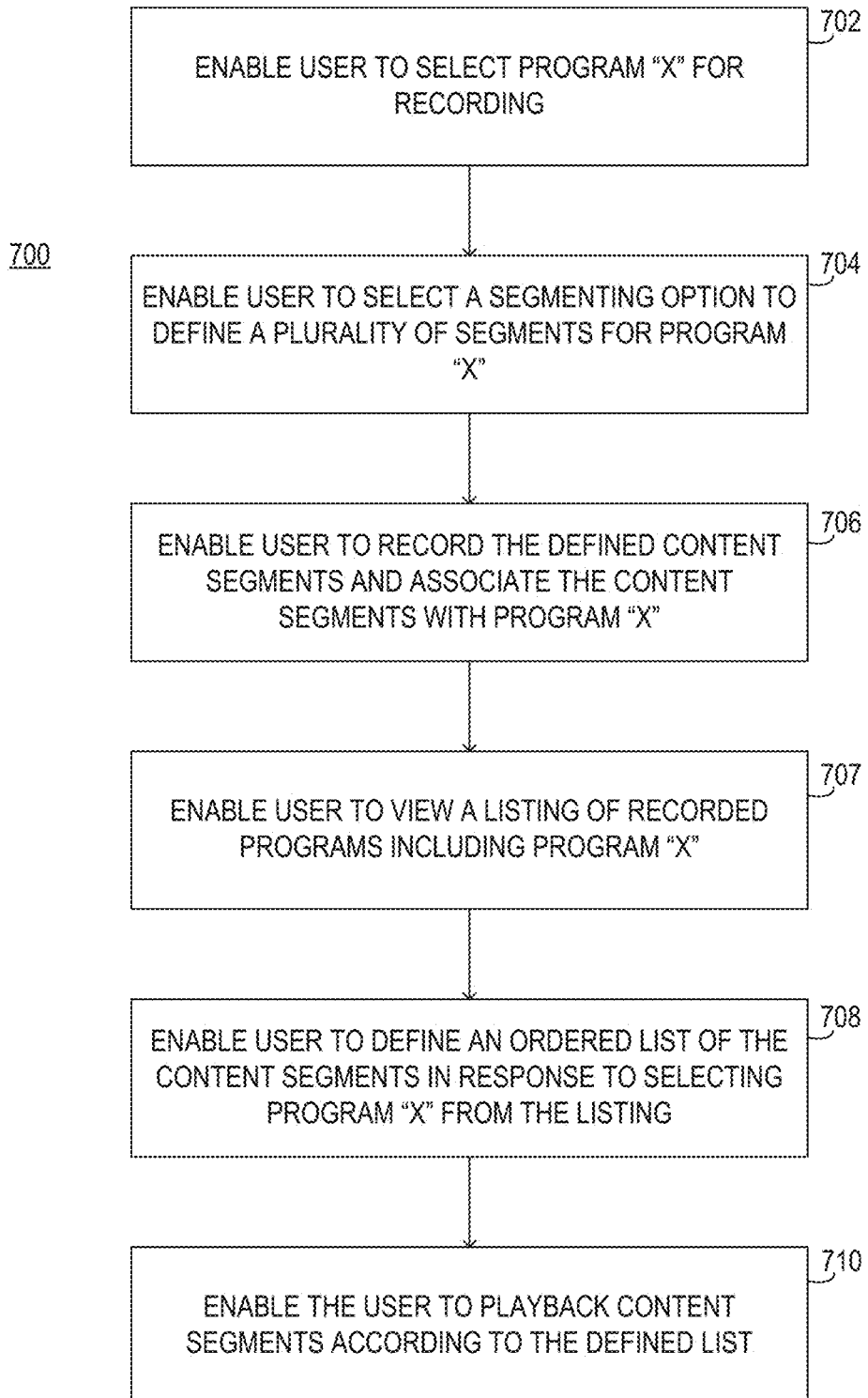
FIG. 7 is a flow diagram of selected elements of an embodiment of a method and program for delivering multimedia content.

Referring now to FIG. 7, a flow diagram illustrates selected elements of an embodiment of a method 700 for providing automated and segmented DVR functionality to a subscriber or other user. The depicted embodiment of method 700 includes enabling (block 702) a user to select a program, e.g., Program "X" for recording and enabling (block 704) the user to select a segmenting option to define a plurality of segments for Program "X". The depicted embodiment of method 700 further includes enabling (block 706) the user to record the defined content segments and associate the content segments with Program "X". The method 700 further includes enabling (block 707) the user to view a listing of recorded programs including Program "X" and enabling (block 708) the user to define an ordered list of the content segments in response to selecting Program "X" from the listing. Method 700 as shown further includes enabling (block 710) the user to playback content segments according to the defined playlist.

Figure 8:
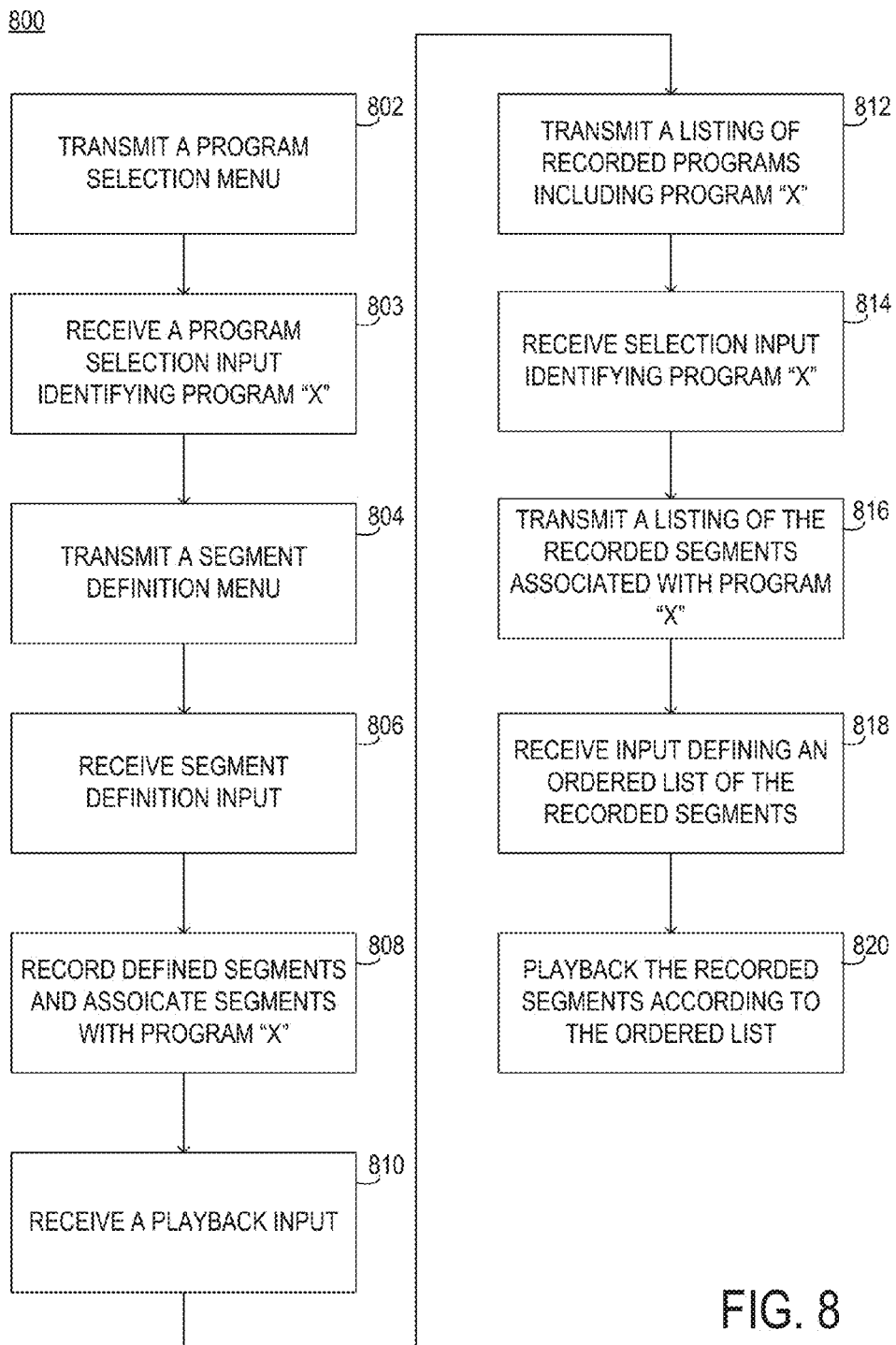
FIG. 8 is a flow diagram of selected elements of an embodiment of a computer program product for delivering multimedia content.

Referring now to FIG. 8, a flow diagram illustrates selected elements of an embodiment of a method 800 for recording and playing back multimedia content. The depicted embodiment of method 800 includes transmitting (block 802) a program selection menu and receiving (block 803) a program selection input that identifies a particular program (Program X). A segment definition menu is then transmitted (block 804) and segment definition input is received (block 806) from the user. The segments selected or defined by the user are then recorded (block 808) and associated with Program X so that, when Program X is subsequently selected for play back, it is identifiable as a segmented program.

Method 800 as shown further includes receiving (block 810) a playback input from the user when the user wants to playback a recorded program. A listing of the recorded programs including Program X is then transmitted to the user in block 812. Method 800 includes receiving (block 814) a segment selection input from the user that identifies Program X as the program to be played back. A listing of the recorded segments associated with Program X is then transmitted (block 816) to the user. The method then receives (block 818) input defining an ordered list of the recorded segments and plays back (block 820) recorded segments according to the ordered list defined by the user.

Figure 9:
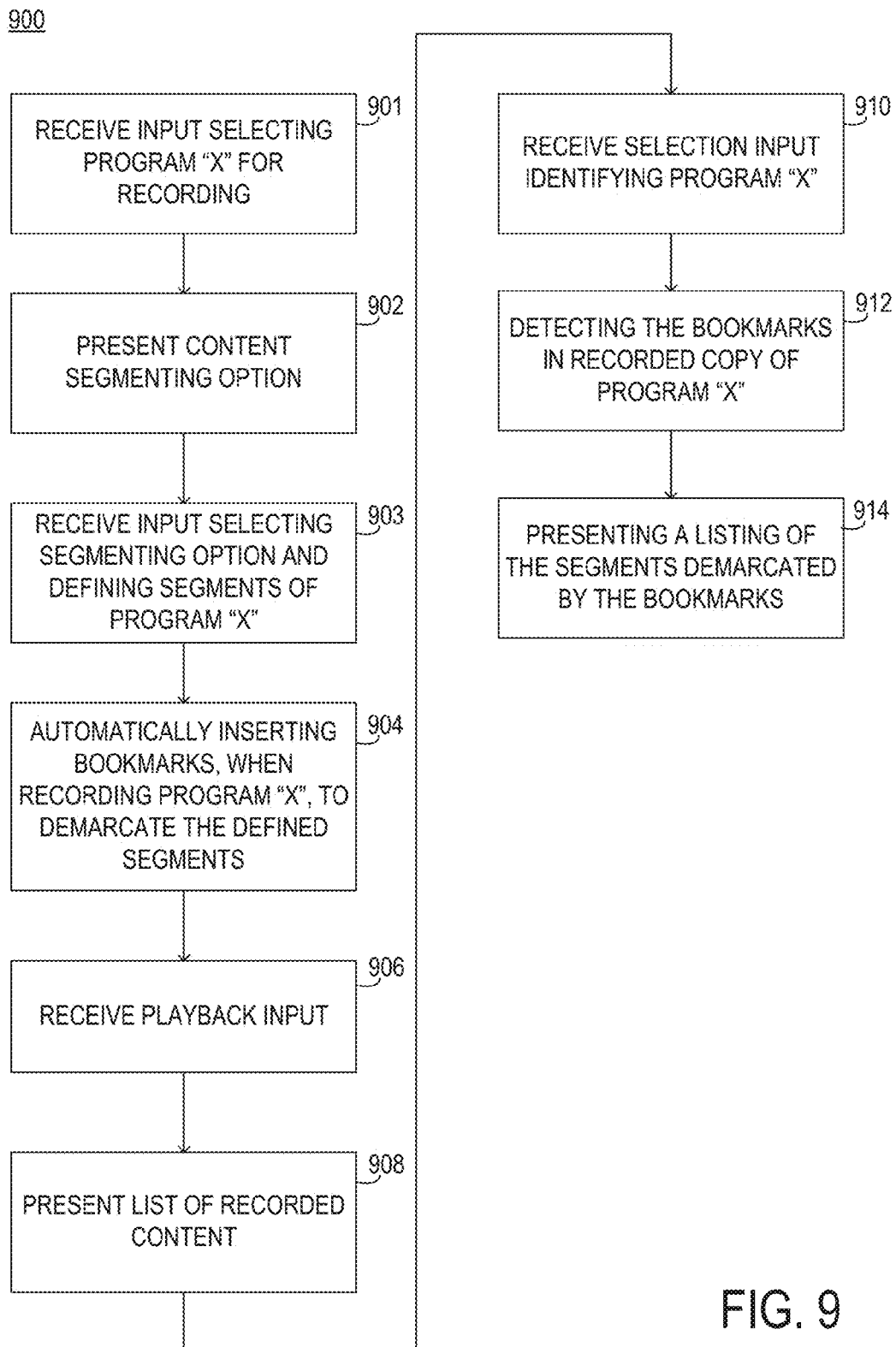
FIG. 9 is a flow diagram of selected elements of an embodiment of a computer program product for delivering multimedia content.

Referring now to FIG. 9, a flow diagram illustrates selected elements of another embodiment of a method 900 for recording multimedia content. The depicted embodiment of method 900 includes receiving (block 901) user input selecting a particular program (Program X) for recording and presenting (block 902) the user with a content segmenting option. Input selecting the segmenting option is received (block 903) and defining the segments of Program X by, for example, defining the size in minutes of each segment. Method 900 as shown then automatically inserts (block 904) bookmarks within the recorded copy of Program X to demarcate the defined segments.

Method 900 then includes receiving (block 906) a playback input and presenting (block 908) a list of recorded programs. A selection input identifying Program X is then received (block 910) and the bookmarks inserted within Program X are detected (block 912). A listing of the segments demarcated by the bookmarks is then presented (block 914) to the user enabling the user to identify one or more segments for playback.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A multimedia recorder, comprising:
   a hardware processor;
   a network adapter for receiving multimedia content delivered from a multimedia service provider via a multimedia network;
   a user input interface for receiving user input; and
   a storage resource comprising processor executable instructions wherein the instructions, when executed by the hardware processor, cause the hardware processor to perform operations comprising:
   receiving a signal indicative of a request to record a program;
   prompting a user to indicate a particular segment size by displaying a program segment menu including: a suggested segment size menu element indicating a plurality of suggested segment sizes and a user specified segment size menu element, wherein the suggested segment sizes are determined in accordance with metadata of the program;
   storing the program in a plurality of program segments of the particular segment size in the storage resource;

responsive to a request to playback the program, displaying a segment selection menu including a single segment selection menu element, a multiple segment selection menu element, and an all segments selection menu element; and playing back particular program segments in accordance with particular program segments indicated by the user via the segment selection menu and in accordance with an ordering, indicated by the user, of the particular program segments.

2. The multimedia recorder of claim 1, wherein each of the plurality of program segments records a successive transmission segment of the multimedia content.

3. The multimedia recorder of claim 1, wherein the multimedia network includes an Internet protocol television network.

4. The multimedia recorder of claim 3, wherein the multimedia network includes a coaxial cable-based network.

5. The multimedia recorder of claim 1, wherein the operations include: accessing data indicative of a default segment size.

6. The multimedia recorder of claim 5, wherein the operations include:
listing programs stored in the storage resource; and
enabling the user to select a particular program from the listing.

7. The multimedia recorder of claim 6, wherein the operations include: responsive to determining that the particular program has segments, displaying a separate menu of the program segments to the user.

8. The multimedia recorder of claim 6, wherein the operations include:
playing back a selected content segment and successive program segments responsive to determining one content segment was selected.

9. The multimedia recorder of claim 8, wherein the ordering specifies a sequence of the particular program segments in which a first particular program segment precedes a second particular program segment during playback, wherein the second particular program segment precedes the first particular program segment chronologically.

10. The multimedia recorder of claim 9, wherein the ordering omits a third particular program segment and wherein playing back the particular program segments includes skipping over the third particular program segment.

11. A program recording method, comprising:
receiving a signal indicative of a request to record a program;
prompting a user to indicate a particular segment size by displaying a program segment menu including: a suggested segment size menu element indicating a plurality of suggested segment sizes and a user specified segment size menu element, wherein the suggested segment sizes are determined in accordance with metadata of the program;
storing the program in a plurality of program segments of the particular segment size in a storage resource;
responsive to a request to playback the program, displaying a segment selection menu including a single segment selection menu element, a multiple segment selection menu element, and an all segments selection menu element; and
playing back particular program segments in accordance with particular program segments indicated by the user via the segment selection menu and in accordance with an ordering, indicated by the user, of the particular program segments.

12. The method of claim 11, wherein each of the plurality of program segments records a successive transmission segment of the program, the method further comprising:
enabling the user to select a plurality of programs to record.

13. The method of claim 12, wherein the particular segment size indicates a segment size applicable to the plurality of programs.

14. The method of claim 11 further comprising, enabling the user to erase specific segments from storage.

15. The method of claim 11, wherein each segment is listed in a catalogue and the catalogue is saved in storage.

16. A non-transitory computer readable medium comprising computer executable instructions that, when executed by a processor, cause the processor to perform operations comprising:
prompting a user to indicate a particular segment size by displaying a program segment menu including: a suggested segment size menu element indicating a plurality of suggested segment sizes and a user specified segment size menu element, wherein the suggested segment sizes are determined in accordance with metadata of the program;
storing the program in a plurality of program segments of the particular segment size in a storage resource;
responsive to a request to playback the program, displaying a segment selection menu including a single segment selection menu element, a multiple segment selection menu element, and an all segments selection menu element; and
playing back particular program segments in accordance with particular program segments indicated by the user via the segment selection menu and in accordance with an ordering, indicated by the user, of the particular program segments.

17. The non-transitory computer readable medium of claim 16, wherein the operations include:
responding to receiving a selection signal corresponding to a specific segment from the user by displaying the specific segment.

18. The non-transitory computer readable medium of claim 16, wherein the operations include:
automatically inserting a plurality of bookmarks at user selectable locations within a selected program.

19. The non-transitory computer readable medium of claim 18, wherein the bookmarks demarcate chapters.

* * * * *